April 12, 1960
J. MORKOSKI
2,932,143
HAY CRUSHER WITH AUTOMATIC ROLL POSITIONER
Filed Jan. 17, 1958
2 Sheets-Sheet 1
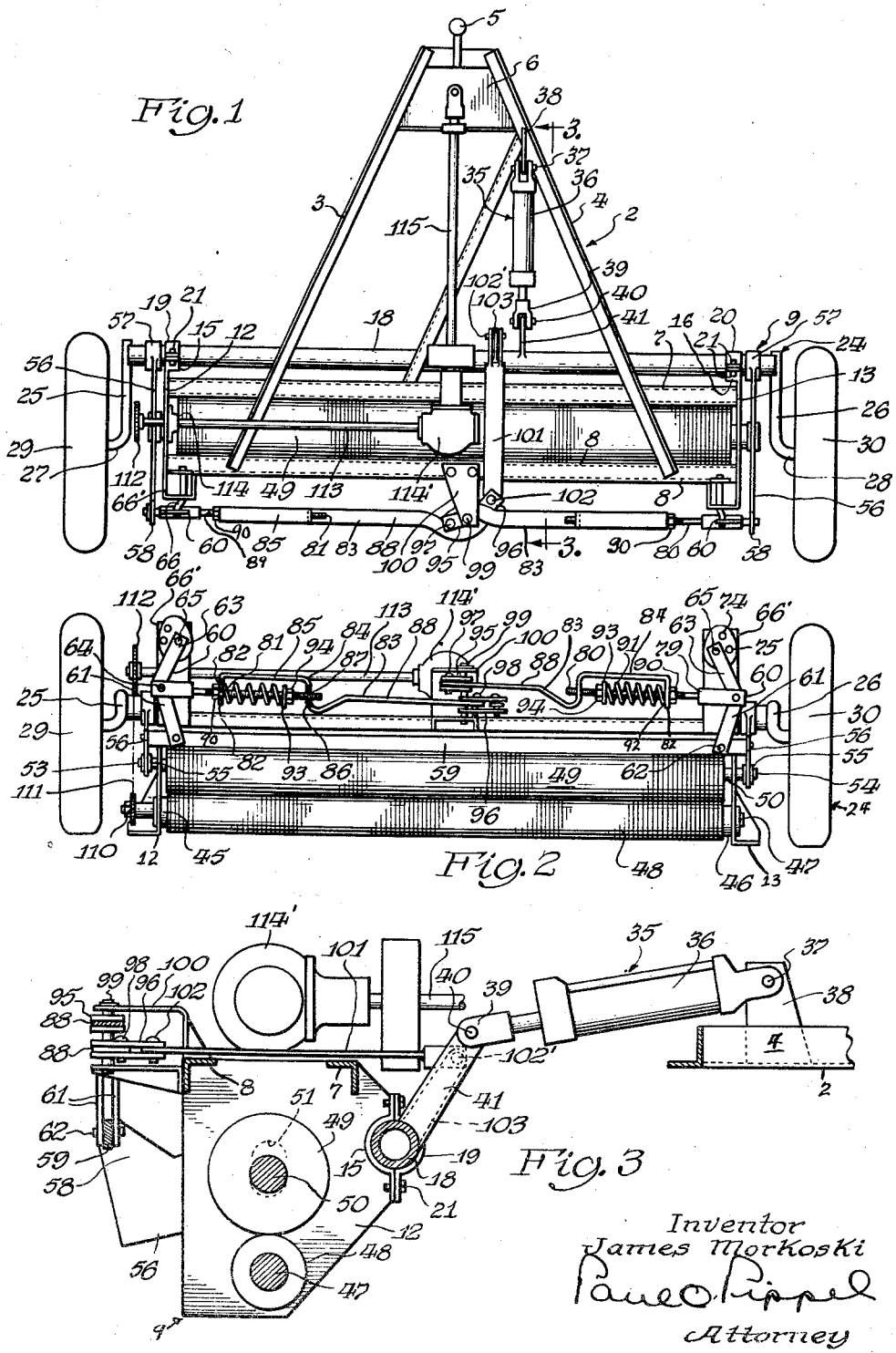

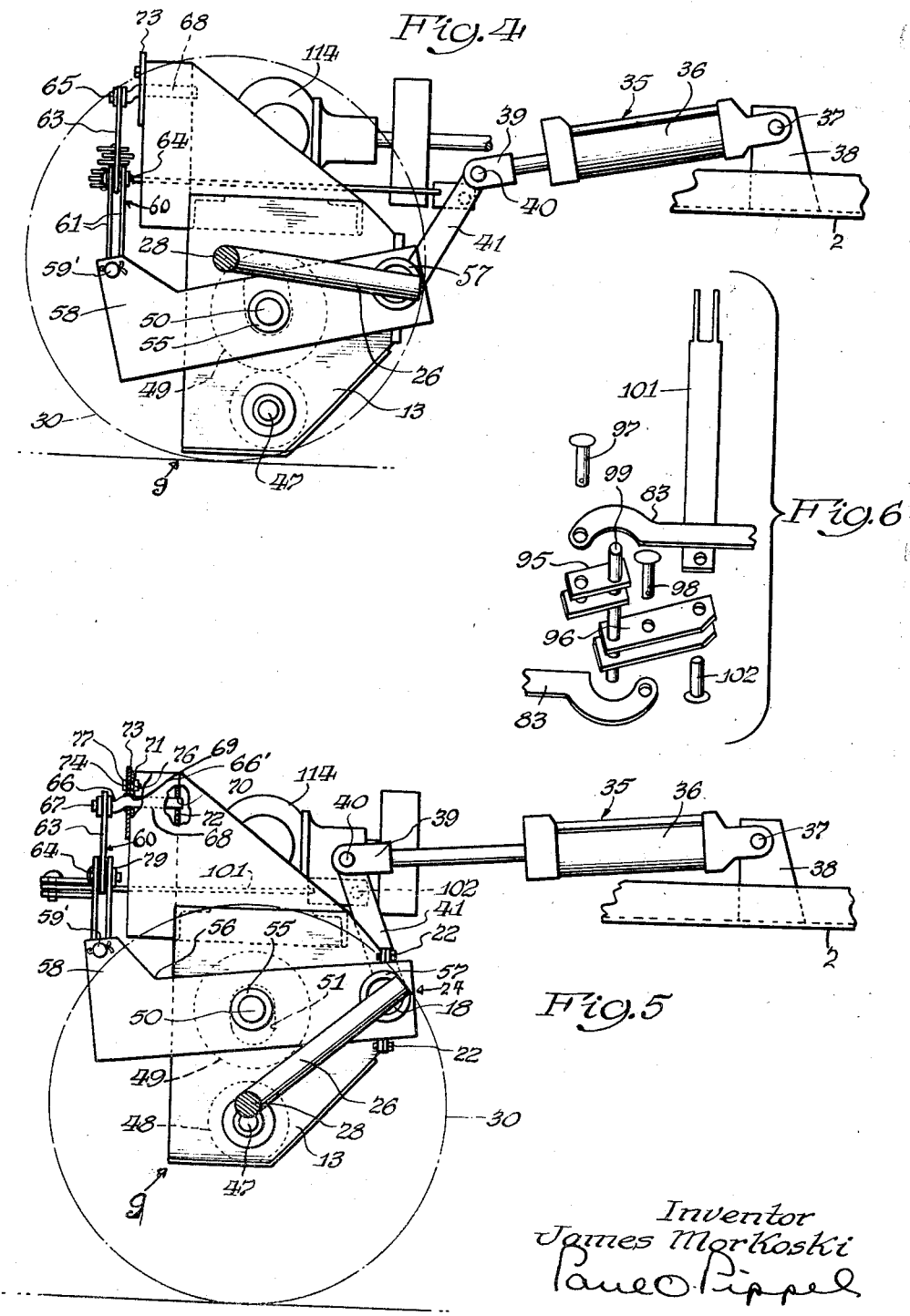

United States Patent Office 2,932,143
Patented Apr. 12, 1960

2,932,143

HAY CRUSHER WITH AUTOMATIC ROLL POSITIONER

James Morkoski, Des Plaines, Ill., assignor to International Harvester Company, Chicago, Ill., a corporation of New Jersey Application January 17, 1958, Serial No. 709,671

8 Claims. (Cl. 56—1)

This invention relates to hay crushers and more particularly to a novel mechanism for closing the crushing rolls when the machine is placed in an operative position and automatically releasing or opening the rolls when the machine is raised to transport position.

A general object of the invention is to provide a novel roll positioning device which incorporates a toggle linkage for developing loading on the crushing rolls.

A more specific object of the invention is to provide a novel operating mechanism for closing and opening the crushing rolls wherein the linkage includes toggle means operative to load the rolls and the toggle means being actuated by spring means which in turn are loaded and unloaded attendant to the device being conditioned to operative and to an inoperative position respectively.

These and other objects of the invention will become more apparent from the specification and the drawings wherein:

Figure 1 is a plan view of a hay conditioning apparatus incorporating the invention;

Figure 2 is a rear elevational view of the apparatus;

Figure 3 is a transverse vertical sectional view taken substantially on the line 3—3 of Figure 1;

Figure 4 is an end view of the hay conditioning apparatus with portions of the frame broken away to more clearly illustrate the invention and parts shown in operating position;

Figure 5 is a further side elevational view partially broken away and illustrating the transport position; and Figure 6 is a fragmentary exploded perspective view of the spring load control mechanism.

Describing the invention in detail and having particular reference to the drawings, there is shown a framework generally indicated 2 which comprises a pair of forwardly converging beam members 3 and 4 which terminate in a hitch point 5 herein shown as a ball which is mounted on the interconnecting plate 6 between the forward ends of the members 3 and 4. The rear portions of the members 3 and 4 are connected, preferably by welding, to transverse front and rear beam members 7 and 8 of the crushing unit generally designated 9, the members 7 and 8 being integrally united at opposite ends with end plates or panels 12 and 13 which at their forward ends are provided with socket portions 15 and 16 receiving a transverse rockshaft 18 therein, the rockshaft being held in assembly with the socket portions 15 and 16 by clamps 19 and 20 which are suitably connected to the respective sockets 15 and 16 by bolts 21 and 22.

The rockshaft 18 forms part of a wheel and axle assembly generally designated 24 which at each end of the rockshaft 18 comprises rearwardly projecting arms 25 and 26 which at their rear ends are formed to provide outwardly projecting spindles 27 and 28 rotatably mounting the wheels 29 and 30 which carry the unit from the ground.

The rockshaft and wheel and axle assembly are actuated by a hydraulic motor or ram generally designated 35 which has a cylinder portion 36 pivoted as at 37 to a bracket 38 fixedly connected to the member 4. The piston end 39 is pivoted as at 40 to the outer end of an arm 41 which projects upwardly and forwardly from the rockshaft 18 and is pivotally united therewith at its lower ends as by welding. Thus it will be seen that actuation of the hydraulic unit 35 raises and lowers the frame and the mechanism carried thereby with respect to the ground pursuant to the crank action of the arm assemblies 25 and 26 in elevating and lowering the wheels.

The end members 12 and 13 are provided with bearings 45 and 46 which mount the center shaft 47 of a lower combination crushing and pickup roll generally designated 48. This roll cooperates with an upper roll 49 which has a center shaft 50, the shaft 50 projecting at each end through a vertically elongated slot 51 in the associated end panel whereby the upper roll is movable vertically with respect to the lower roll. The end portions 53 and 54 (Fig. 2) of the center shaft 50 of the upper roll 49 are carried in bearings 55 provided intermediate the ends on a pair of arms 56 which are disposed outwardly of the panels 12 and 13. Each arm 56 is provided with a forward sleeve portion 57 by means of which it is sleeved over the adjacent end of the rockshaft 18 for pivotal movement vertically thereabout and the rear end of each arm or lever 56 is provided with an upstanding ear 58 which is pivotally connected as at 59' to a transversely extending equalizer rod or shaft 59. Thus both arms 56 are caused to operate together. The bar 59 is actuated by a pair of toggle mechanisms 60 disposed at opposite ends of the bar 59, each mechanism 60 comprising a pair of lower links or straps 61 which at their lower ends are pivoted on a fore and aft extending axis by a pin 62 at the adjacent end of the bar 59, the link 61 embracing at their upper ends the lower end of an upper link 63 and being pivotally connected thereto as by pin 64, the upper end of the link 63 being pivoted as at 65 (Fig. 4) by a crank 66 to an upstanding standard 66' which is formed integral with the rear beam member 8 and the adjacent panel 12 or 13. It will be seen that the crank 66 has a portion 67 pivoted to the upper end of the associated link 63 and that the shaft portion 68 of the crank is rotatably mounted in apertures 69 and 70 in the rear and front wall portions 71 and 72 of the box-section standards 66'. The shaft portion 68 is connected to a plate 73 and the plate 73 is provided with a series of apertures 74 and 75 which register with an aperture 76 on the rear wall 71 of the associated standard for reception of a securing bolt 77 for positioning the crank and thus the point of pivot of the upper link 63 with respect to the associated frame.

The pin 64 also pivotally connects with a jaw 79 of a tension rod 80 which extends through an opening 81 in a lug 82 formed on the outer end of a pull bar 83. It will be seen that the lug 82 forms one of the legs of a U-shaped outer end portion 84 on the strap 83 which is connected to the bight portion 85 which extends lengthwise generally parallel to the rod 80 and adjacent to the inner end of the rod 80 connected to the inwardly extending leg portion 86 which is apertured at 87 and provides a guide for the inner end of the pull rod 80 which passes through the aperture 87, the leg 87 emerging into the shank portion 88 of the strap.

The pull rod 80 is threaded along substantially its entire length and is provided with a nut 90 which is disposed outwardly of the lug portion 82 and limits the amount of expansion of the compression spring 91 which is sleeved over the rod 80 and disposed between the legs 82 and 86 and seating at one end as at 92 against the inner side of the lug portion 82 and at its other end seating against the washer 93 which is held in adjusted positioned against the spring to determine its compression by a nut 94 which is threaded on the rod portion 80. It will be thus observed that the amount of initial compression of the spring 91 is determined by the relationship of the nuts 90 and 94 which in turn determines the loading on the toggle mechanism 60. The straps 83 are adapted to be pulled toward each other by the crank arms 95 and 96, the arm 95 being connected to the rightward strap 83 as by pin 97 on a substantially vertical axis and the arm 96 being connected as by pin 98 to the leftward strap 83. The arms 95 and 96 are connected rigidly to a vertical shaft 99 which is mounted in a bracket 100 carried by the rear frame member 8. The crank structure is rotated by a combination push-and-pull rod 101 which is connected at its rear end as at 102 on a vertical axis by a pin to an extension of the crank arm 96, the strap 101 having its forward end pivoted as at 102' to the upper end of an upstanding arm 103 which at its lower end is rigidly connected to the rockshaft 18. Thus it will be seen that when the rockshaft is rotated in a direction lowering the wheels for raising the frame the push rod 101 is moved rearwardly and the crank structure is rotated in a clockwise direction as seen in Figure 1 whereby the structures 83 are moved apart thus decompressing the springs 91 and releasing the toggles so that the equalizer bar 59 is urged upwardly with attendant upward movement of the arms 56 and the upper roller separated from the lower roller. To reengage the action is reversed and the toggles loaded and the upper roll engaged with the lower while the crusher is lowered to operating position.

The lower roller is the only one driven in the present instance although it will be readily apparent that both rollers could be driven and the drive in the present construction comprises a sprocket 110 mounted on the shaft 47 of the lower roller which is driven by a chain 111 (diagrammatically shown in Fig. 2) driven by sprocket 112 on a countershaft 113 journalled in a bearing 114 on the frame, the shaft 113 being driven through a gear box 114' from which projects a forwardly extending shaft 115 carried on bearings on the frame, the shaft 115 being suitably connectible to a power take-off shaft of an associated tractive device such as a tractor.

What is claimed is:

1. A hay crushing and pickup device comprising an ambulatory frame, a wheel and axle assembly disposed in supporting relation to the frame and positionable to adjust the device between a lowered operative position and an upper inoperative position, a pair of crushing rolls supported on the frame, said rolls movable toward and away from each other, and single operating linkage interconnecting the assembly and said rolls for automatically moving said rolls toward each other attendant to lowering of the device and separating the rolls when the device is elevated.

2. A crop gathering and crushing device comprising a frame, a rockshaft mounted upon the frame for swinging movement on a generally horizontal axis, arms connected to the rockshaft, wheels journalled on the arms for supporting the frame through the rockshaft off the ground, a pair of superposed crushing rolls rotatably supported on the frame transversely of the direction of movement of the device and developing a forwardly open bite and movable vertically relative to each other for opening and closing said bite, and single means including linkage operatively interconnecting said rolls with said rockshaft for coincidentally opening the rolls upon elevation of the device and closing the rolls upon lowering of the device.

3. A crop pickup and crushing device comprising a frame, a wheel and axle assembly adjustably mounting the frame between operating and transport positions, a pair of superposed crushing rolls carried on the frame transversely of the direction of movement of the device and forming a forwardly open bite, one of said rolls movable with respect to the other to open and close the bite, and single means operatively interconnecting said assembly with said movable roll for conjunctive movement.

4. The invention according to claim 3 and said means comprising spring actuated toggle linkage operative between the frame and movable roll, and toggle release means connected between said linkage and the assembly.

5. The invention according to claim 4 and said means comprising a pair of toggles connected between the frame and respective ends of the movable roll, spring means operatively connected to respective toggles, and crank means operatively associated with the spring means for loading and unloading the same, and means interconnecting the crank means with the wheel and axle assembly.

6. A hay crushing and pickup device comprising a transversely elongated frame, a transverse rockshaft journalled on the frame, arms on the rockshaft, ground wheels mounted on the arms, a pair of upper and lower transverse rolls mounted on the frame and developing a forwardly open bite, said upper roll movable up and down for opening and closing the bite, a toggle at each end of the frame operatively connected to the adjacent end of the movable roll, spring means connected at one end to each toggle, a crank mounted on the frame between the spring means and having arms connected to respective thereof and rotatable in one direction to load the spring means and in the other direction to unload them, means including a rod connecting the rockshaft with the crank whereby rotation of the rockshaft operates the rod, and an operator connected to the rockshaft for operating the rockshaft to raise and lower the device, said operator connected to the rod through the rockshaft to simultaneously open the rolls upon elevating the device and close the rolls upon lowering the device.

7. The invention according to claim 6 and a lever mounted upon the rockshaft adjacent to each end of the movable roll and connected thereto and to the adjacent toggle.

8. A crusher comprising a transverse ambulatory frame, a pair of superposed transverse upper and lower rolls, said lower roll rotatably mounted on the frame, a lever at each end of the frame having one end pivoted on the frame and connected intermediate its ends to the adjacent end of the upper roll and biasing means connected to the other end of each lever and said biasing means comprising a pair of toggles at each end of the frame mounted on fore and aft axes, and an equalizer extending between said toggles and interconnecting the same and said levers, and a single operator operatively connected to the equalizer.

References Cited in the file of this patent

UNITED STATES PATENTS

| | | |
|---|---|---|
| 2,592,269 | Getz | Apr. 8, 1952 |
| 2,811,819 | Heth | Nov. 5, 1957 |